United States Patent [19]

Davila et al.

[11] Patent Number: 4,976,510
[45] Date of Patent: Dec. 11, 1990

[54] COMMUNICATION OUTLET

[75] Inventors: Dan I. Davila, Hickory; John A. Midkiff, Charlotte, both of N.C.; Dulip Ekanayake, Watauga, Tex.

[73] Assignee: Siecor Corporation, Hickory, N.C.

[21] Appl. No.: 438,849

[22] Filed: Nov. 20, 1989

[51] Int. Cl.⁵ .............................................. G02B 6/26
[52] U.S. Cl. ............................. 350/96.20; 350/96.21; 350/96.22
[58] Field of Search ................ 350/96.20, 96.21, 96.22

[56] References Cited

U.S. PATENT DOCUMENTS

| | | | |
|---|---|---|---|
| 4,752,110 | 6/1988 | Blanchet et al. | 350/96.20 |
| 4,818,054 | 4/1989 | George et al. | 350/96.20 |
| 4,884,863 | 12/1989 | Throckmorton | 350/96.22 X |
| 4,898,448 | 2/1990 | Cooper | 350/96.20 |
| 4,900,123 | 2/1990 | Barlow et al. | 350/96.20 |

FOREIGN PATENT DOCUMENTS 55-163508(A) 12/1980 Japan .......................... 350/96.20
60-202407(A) 10/1985 Japan .......................... 350/96.20

OTHER PUBLICATIONS

"Siecor Fiber Optic Wall Outlets" advertisement, 1986, Levitor Telcon advertisement for Max-)Plus, 1988. Amp communication advertisement, 1988, Brand-Rex ACO outlet advertisement, BRIntec Corporation.

Primary Examiner—Frank Gonzalez
Assistant Examiner—Phan T. Heartney
Attorney, Agent, or Firm—J. David Abernethy

[57] ABSTRACT

A wall communications outlet having a backplate with a central circular opening; first and second sets of sidewalls ringed about the central opening to act as a storage area for optical fibers or copper wires; and a set of upstanding posts mounted to the backplate with slots therein to accommodate connector panels held in the slots. A variety of connector sleeves can be fitted in a connector panel. Cables can enter the wall outlet through the hole in the backplate or from openings in the side of an outlet cover.

5 Claims, 4 Drawing Sheets

COMMUNICATION OUTLET

BACKGROUND OF THE INVENTION

1. Field of the Invention. The field of the invention is wall communication outlets.

2. Background of the Invention.

Wall outlets are necessary in buildings to provide a convenient area for the attachment of various types of devices to building wiring. If the building cable entering the wall outlet is an optical fiber cable or a composite cable having both copper wires and optical fibers, the outlet should be able to accommodate optical fibers, which have minimum bend radius requirements. Some communications outlets accommodate different types of copper wire jacks and connectors, but do not accommodate optical fibers. Other fiber optic wall outlets have an open backplate and accommodate connector sleeves for optical fibers, but do not accommodate copper systems. A completely versatile outlet is needed which accommodates various different connectors, both for copper and optical fiber, provides an adequate means for storage and retention of optical fibers, and allows both types of cables to enter, from the side and from the backplate.

BRIEF SUMMARY OF THE INVENTION

The wall outlet according to the invention is designed to accept fiber optic cables, but copper cables can also be accommodated. Cables can enter from the side of the outlet or through an opening in the middle of the backplate. First and second sets of sidewalls concentric with the backplate opening provide a space for storage of optical fibers to ensure that a minimum bend radius for the optical fibers is maintained. A minimum inner radius of two centimeters is sufficient for this purpose. Tabs project from the second set of sidewalls to help keep the fibers in place.

The outlet can be attached to a variety of exterior surfaces, such as walls or furniture, in either a horizontal or vertical position. It can be mounted on single or double electrical boxes as well as on brackets designed for open systems furniture. Doubleback adhesive strips and adhesive backed magnetic strips can also be attached to the molded plastic backplate for surface mounting.

Upstanding posts are provided on the backwall for mounting of the cover and to hold panels therebetween. Slots are provided in the upstanding posts so that the panels can be slideably removed and inserted. These panels may hold connector sleeves therein for rapid connection and removal of exterior cables, or may be solid panels if no cables are used at that point.

Cables may enter the outlet from a wall through a hole in the backplate, or they may enter from the side. If cable side entry is desired, mounting troughs are provided to support the cable free ends, which may be secured to the troughs by means of common cable ties. The outer jacket is removed for a desired length at the cable ends to allow connectorization.

The backplate and cover are plastic, which may be injection molded. Connector panels may be metal or plastic.

BRIEF DESCRIPTION OF THE DRAWINGS

The detailed description is set out with reference to the drawings, as follows.

DETAILED DESCRIPTION OF THE PREFERRED EMBODIMENT

Figure 1:
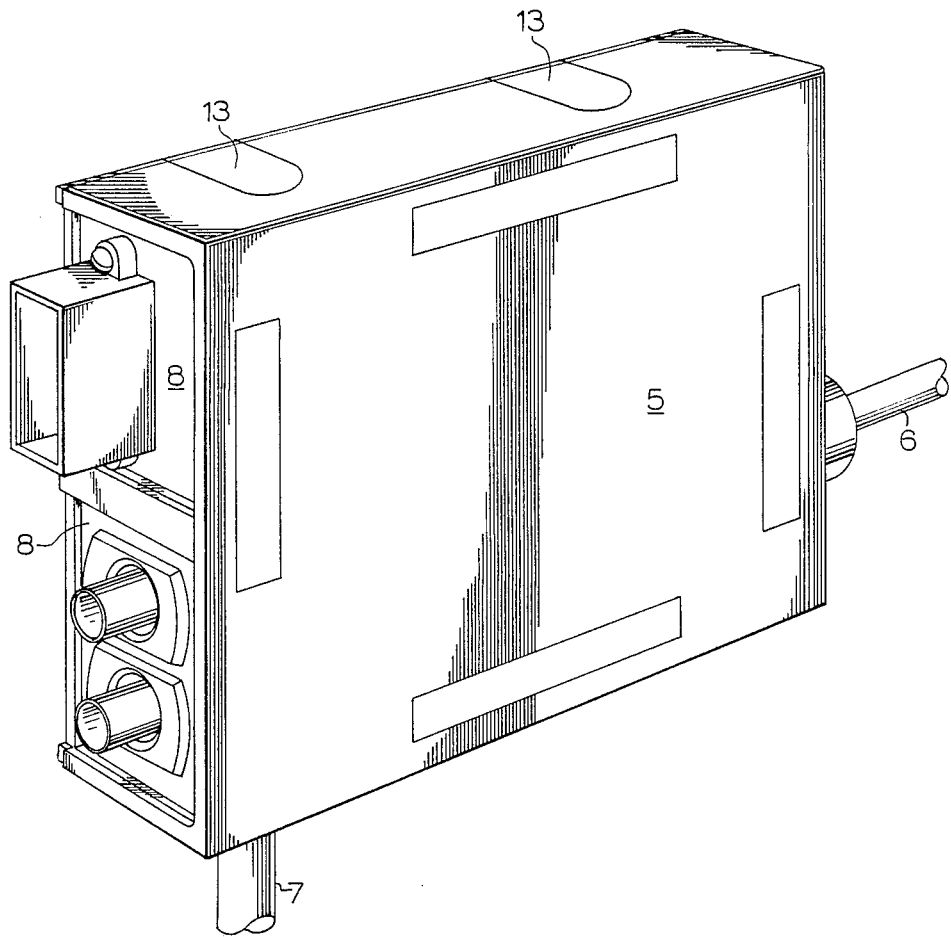
FIG. 1 is a perspective view of the outlet with the cover in place.

The outlet is enclosed by backplate cover 5, shown in FIG. 1. Backplate cover 5 has removable areas 13, called knockouts, to allow for side cable entry if desired.

Figure 2:
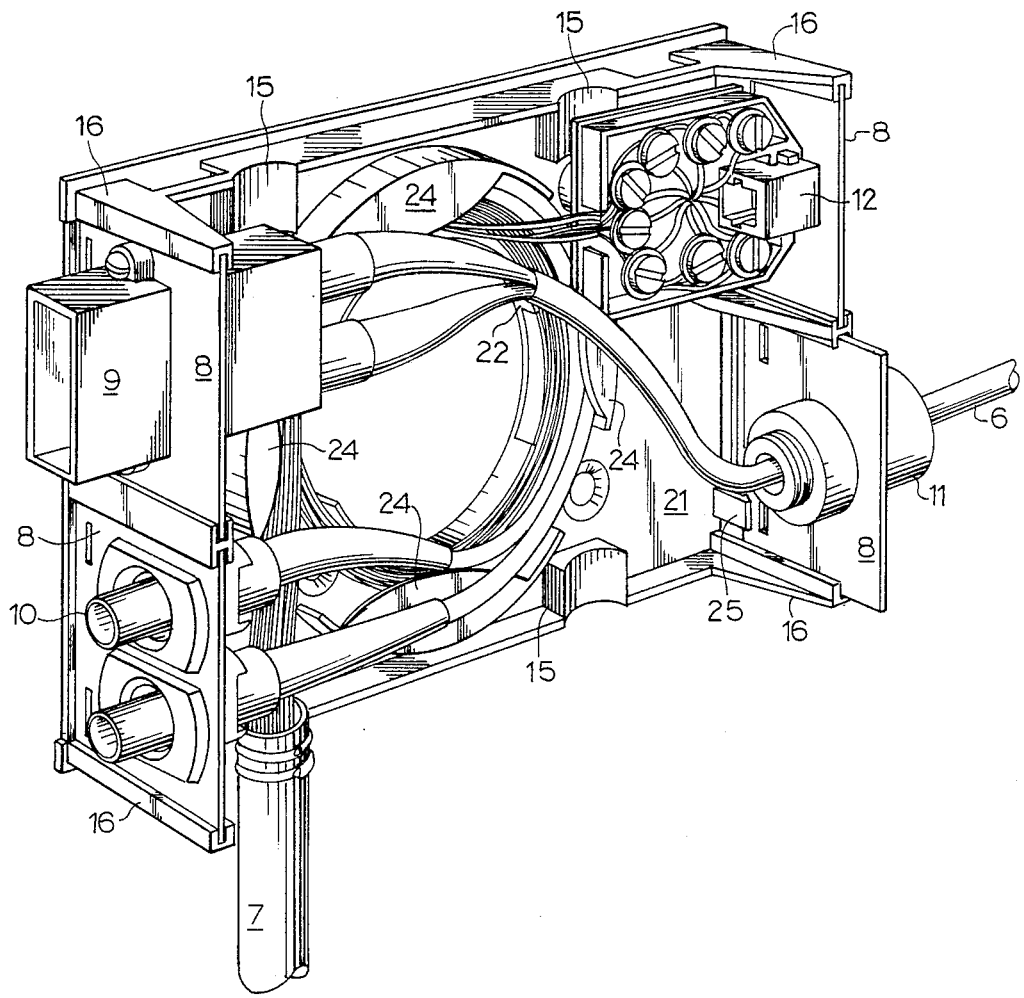
FIG. 2 is the view of FIG. 1 with the cover removed.

In FIG. 2, backplate cover 5 has been removed. Connector panels 8 are slideably inserted into slots 18 of side posts 17 and slots 19 of corner posts 16. Clips 25 mounted on the first side of backplate 21 engage slots 26 in connector panels 8 upon insertion. Cable 6 enters from the side and is held in place by cord connector 11, which is mounted in a connector panel 8. Another cable, 7, is not connectorized. The craftsperson strips away a desired end section of its outer jacket and secures the remaining end portion of the outer jacket to trough 15 by use of a cable tie as shown. Cables may also enter through hole 14 in backplate 21.

Figure 3:
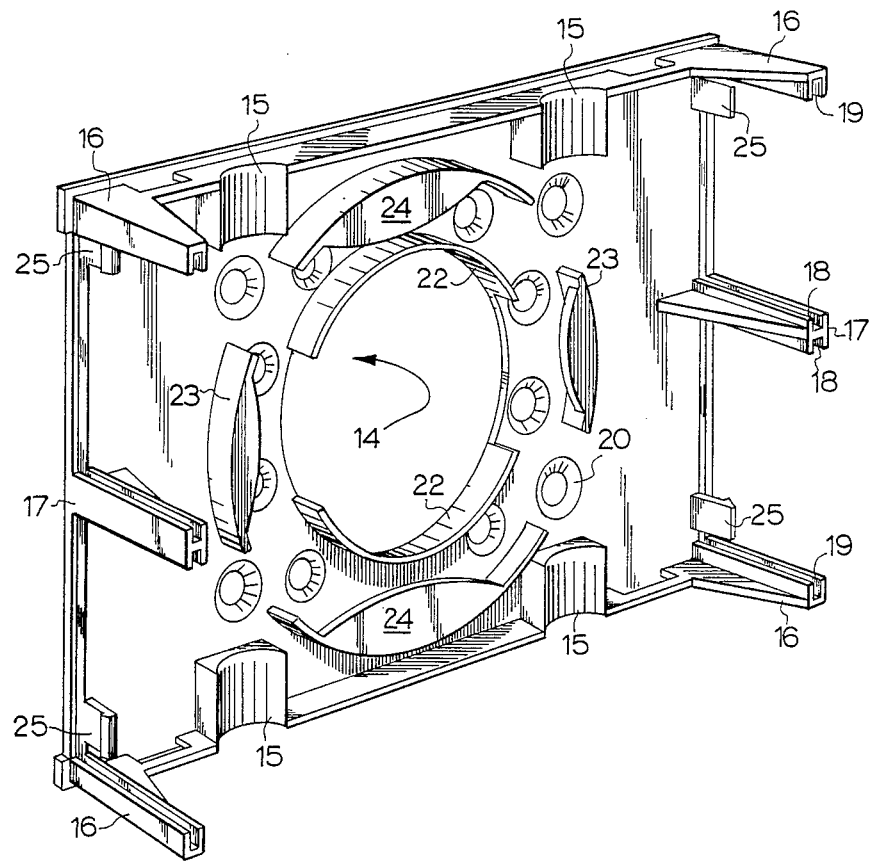
FIG. 3 is the view of FIG. 2 with the cables removed.

A view of backplate 21 with cables removed is shown in FIG. 3. Holes 20 allow the outlet to be secured to an exterior surface by screws. Holes 20 are arranged to promote fixation to a variety of electrical boxes.

First set of sidewalls 22 is concentric with cable opening 14, as is second set of sidewalls 23. Second set of sidewalls 23 have fiber retaining tabs 24 to help secure spare lengths of optical fibers or other communication elements for storage purposes. The radius of first set of sidewalls 22 is at least sufficient to prevent damage to optical fibers placed between the first and second sets of sidewalls due to an excessive degree of bending.

Figure 4:
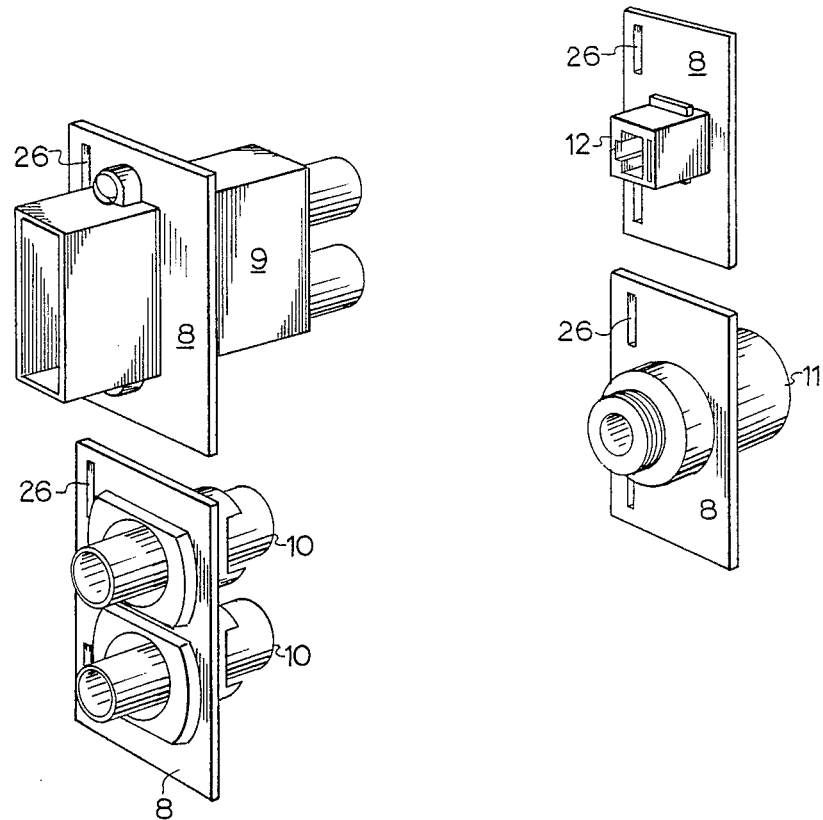
FIG. 4 is a view of isolated connector panels with various connector sleeves being inserted.
Figure 3:
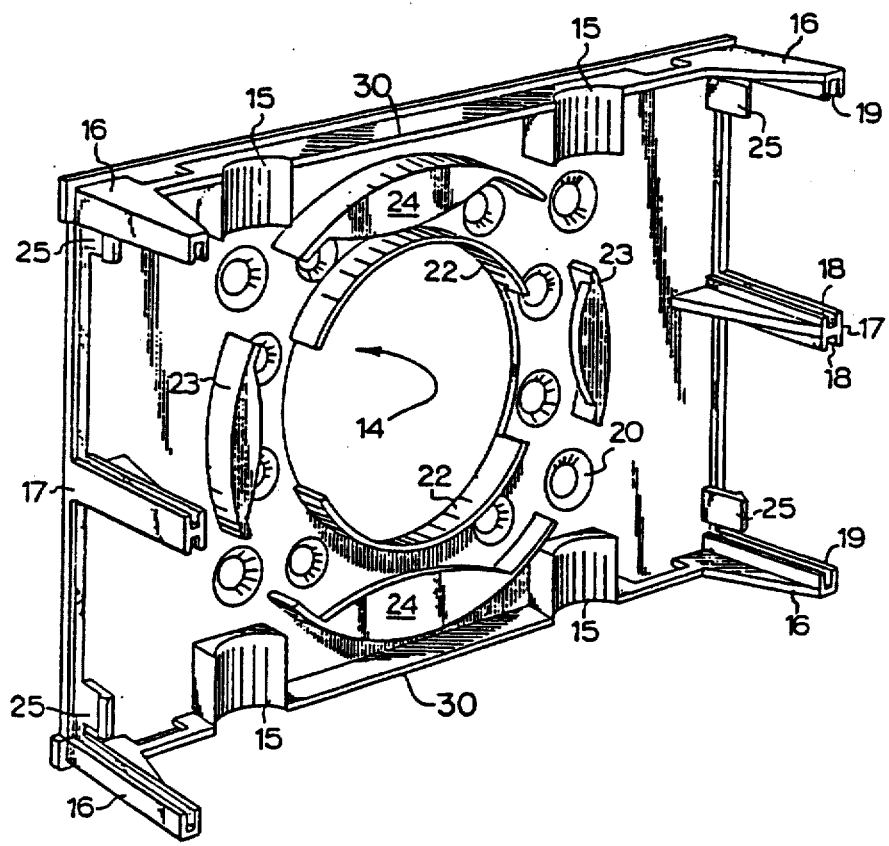

FIG. 4 illustrates differing types of connectors 9, 10, 11 and 12 which may be mounted in connector panels 8. Included are 8-wire modular jack 12, cord connector 11, duplex FDDI connector 9, and simplex fiber optic connector sleeve 10.

What is claimed is:

1. An outlet comprising:
   (a) a backplate having first and second sides, the backplate having an opening therein for receiving a cable;
   (b) a first set of sidewalls mounted to the first side of the backplate, the first set of sidewalls ringed about the opening and having a minimum inner radius equal to or greater than three centimeters;
   (c) a second set of sidewalls mounted to the first side of the backplate ringed about the first set of sidewalls; and,
   (d) mounting means for mounting the backplate flush to an exterior surface.

2. An outlet as recited in claim 1, further comprising:
   (a) a set of posts mounted to the first side of the backplate beyond the second set of sidewalls, each post having at least one slot therein; and,
   (b) one or more connector panels slideably inserted in the slots between two posts.

3. An outlet as recited in claim 2, further comprising at least one trough mounted to the first side of the backplate for receiving a cable into the wall outlet from a direction lateral to the set of posts.

4. An outlet as recited in claim 3, further comprising a backplate cover which is open adjacent to a face of the connector panels and which has a removable section adjacent to the trough.

5. An outlet as recited in claim 2, further comprising a connector sleeve mounted in one or more of the connector panels.

* * * * *

REEXAMINATION CERTIFICATE (2389th)
United States Patent [19]
Davila et al.

[11] B1 4,976,510
[45] Certificate Issued Sep. 13, 1994

[54] COMMUNICATION OUTLET

[75] Inventors: Dan I. Davila, Hickory; John A. Midkiff, Charlotte, both of N.C.; Dulip Ekanayake, Watauga, Tex.

[73] Assignee: Siecor Corporation, Hickory, N.C.

Reexamination Request:
No. 90/003,170, Aug. 16, 1993

Reexamination Certificate for:
Patent No.: 4,976,510
Issued: Dec. 11, 1990
Appl. No.: 438,849
Filed: Nov. 20, 1989

[51] Int. Cl.$^5$ ............................................. G02B 6/26
[52] U.S. Cl. .................................... 385/135; 385/76; 385/77; 385/136; 385/137; 385/139
[58] Field of Search .................. 385/53, 54, 76, 77, 385/135, 136, 137, 138, 139

[56] References Cited

U.S. PATENT DOCUMENTS

| | | | |
|---|---|---|---|
| 4,752,110 | 6/1988 | Blanchet et al. | 385/135 |
| 4,818,054 | 4/1989 | George et al. | 385/135 |
| 4,850,901 | 7/1989 | Smith et al. | 439/676 |
| 4,884,863 | 12/1989 | Throckmorton | 385/135 |
| 4,898,448 | 2/1990 | Cooper | 385/135 X |
| 4,900,123 | 2/1990 | Barlow | 385/135 X |

FOREIGN PATENT DOCUMENTS

| | | | |
|---|---|---|---|
| 3530162 | 3/1987 | Fed. Rep. of Germany | 385/135 X |
| 55-63508 | 12/1980 | Japan | 385/135 X |
| 60-202407 | 10/1985 | Japan | 385/135 X |

OTHER PUBLICATIONS

"Siecor Fiber Optic Wall Outlets" advertisement, 1986.
Levitor Telcon advertisement for Max-Plus, 1988.
AMP Communications advertisement 1988, Catalog 89-835; 2-404723-5.

*Primary Examiner*—Brian Healy

[57] ABSTRACT

A wall communications outlet having a backplate with a central circular opening; first and second sets of sidewalls ringed about the central opening to act as a storage area for optical fibers or copper wires; and a set of upstanding posts mounted to the backplate with slots therein to accommodate connector panels held in the slots. A variety of connector sleeves can be fitted in a connector panel. Cables can enter the wall outlet through the hole in the backplate or from openings in the side of an outlet cover.

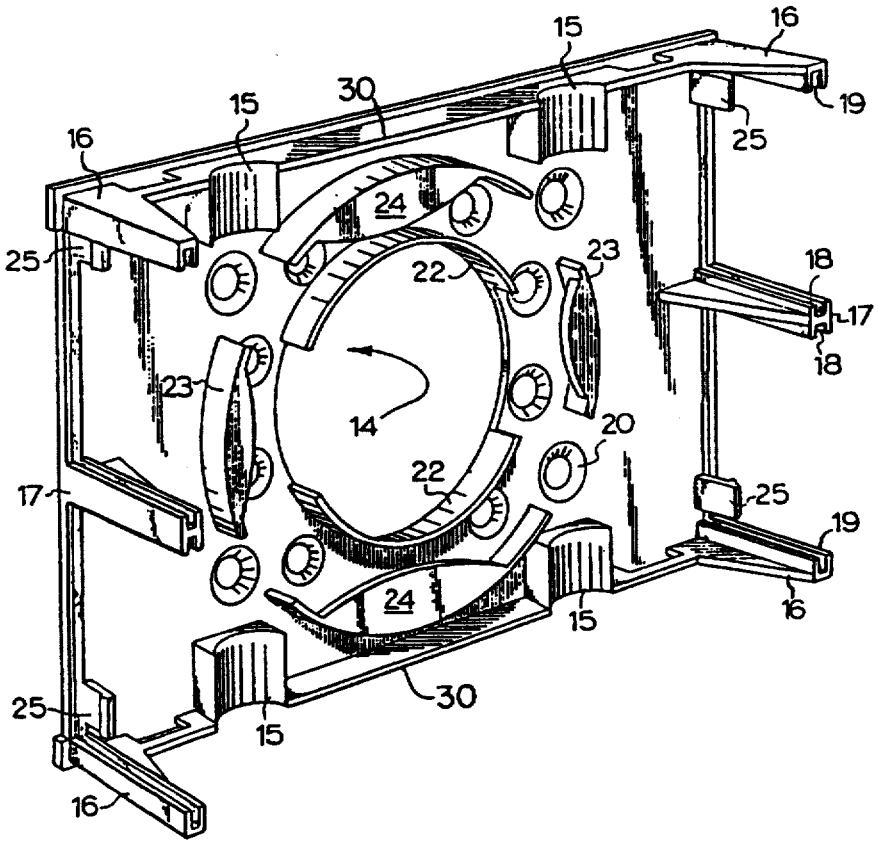

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

The drawing figure(s) have been changed as follows: endwalls 30 have been added to FIG. 3.

ONLY THOSE PARAGRAPHS OF THE SPECIFICATION AFFECTED BY AMENDMENT ARE PRINTED HEREIN.

Column 2, lines 26–33:

First set of sidewalls 22 is concentric with cable opening 14, as is second set of side walls 23. Second set of sidewalls 23 have fiber retaining tabs 24 to help secure spare lengths of optical fibers or other communication elements for storage purposes. The radius of first set of sidewalls 22 is at least sufficient to prevent damage to optical fibers placed between the first and second sets of sidewalls due to an excessive degree of bending. *Second set of sidewalls 23 is spaced apart from endwalls 30.*

AS A RESULT OF REEXAMINATION, IT HAS BEEN DETERMINED THAT:

The patentability of claims 1–5 is confirmed.

New claims 6–9 are added and determined to be patentable.

*6. An outlet comprising:*
*(a) a backplate having first and second sides, the backplate having an opening therein for receiving a cable and a set of endwalls mounted to the first side;*
*(b) a first set of sidewalls mounted to the first side of the backplate, the first set of sidewalls ringed about the opening and having a minimum inner radius equal to or greater than three centimeters;*
*(c) a second set of sidewalls mounted to the first side of the backplate ringed about the first set of sidewalls and spaced apart from the endwalls; and,*
*(d) mounting means for mounting the backplate flush to an exterior surface.*

*7. An outlet as recited in claim 6, further comprising a set of first retaining tabs mounted to the second set of sidewalls.*

*8. An outlet as recited in claim 6, further comprising:*
*(a) a set of posts mounted to the firsts side of the backplate beyond the second set of sidewalls, each post having at least one slot therein; and,*
*(b) one or more connector panels slideably inserted in the slots between two posts.*

*9. An outlet as recited in claim 8, further comprising at least one trough mounted to the first side of the backplate for receiving a cable into the wall outlet from a direction lateral to the set of posts.*

* * * * *

REEXAMINATION CERTIFICATE (2569th)
United States Patent [19]
Davila et al.

[11] B2 4,976,510
[45] Certificate Issued May 9, 1995

[54] COMMUNICATION OUTLET

[75] Inventors: Dan I. Davila, Hickory; John A. Midkiff, Charlotte, both of N.C.; Dulip Ekanayake, Watauga, Tex.

[73] Assignee: Siecor Corporation, Hickory, N.C.

Reexamination Request:
No. 90/003,528, Aug. 10, 1994

Reexamination Certificate for:
Patent No.: 4,976,510
Issued: Dec. 11, 1990
Appl. No.: 438,849
Filed: Nov. 20, 1989

Reexamination Certificate:
Patent No.: B1 4,976,510
Issued: Sept. 13, 1994

[51] Int. Cl.$^6$ .............................. G02B 6/26
[52] U.S. Cl. ...................... 385/135; 385/76; 385/77; 385/136; 385/137; 385/139
[58] Field of Search ............ 385/53, 54, 76, 77, 385/135, 136, 137, 138, 139

[56] References Cited
U.S. PATENT DOCUMENTS

| | | | |
|---|---|---|---|
| 2,457,002 | 12/1948 | Spiro | 217/69 |
| 4,722,585 | 2/1988 | Boyer | 350/96.20 |
| 4,850,901 | 7/1989 | Smith et al. | 439/676 |
| 4,858,076 | 8/1989 | Tsai | 361/417 |
| 4,900,123 | 2/1990 | Barlow et al. | 350/96.20 |

FOREIGN PATENT DOCUMENTS 3530162  3/1987  Germany .............. 385/135

*Primary Examiner*—Brian Healy

[57] ABSTRACT

A wall communications outlet having a backplate with a central circular opening; first and second sets of sidewalls ringed about the central opening to act as a storage area for optical fibers or copper wires; and a set of upstanding posts mounted to the backplate with slots therein to accommodate connector panels held in the slots. A variety of connector sleeves can be fitted in a connector panel. Cables can enter the wall outlet through the hole in the backplate or from openings in the side of an outlet cover.

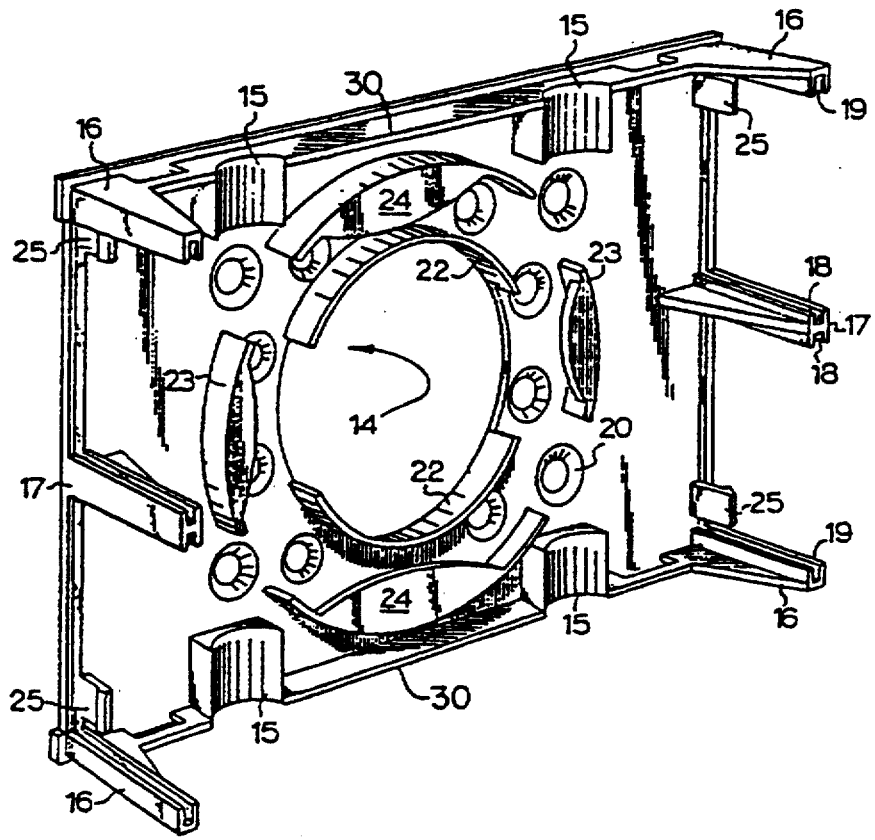

REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1–8 and 9 is confirmed.

* * * * *